US010680295B2

(12) United States Patent
Fung et al.

(10) Patent No.: US 10,680,295 B2
(45) Date of Patent: Jun. 9, 2020

(54) SYSTEM AND METHOD FOR SEPARATING BATTERY CELL CORES (71) Applicants: Ka Yip Fung, Hong Kong (CN); Lingda Xu, Hong Kong (CN); Ka Ming Ng, Hong Kong (CN)

(72) Inventors: Ka Yip Fung, Hong Kong (CN); Lingda Xu, Hong Kong (CN); Ka Ming Ng, Hong Kong (CN)

(73) Assignee: ICREATE LIMITED, Hong Kong (CN)

( * ) Notice: Subject to any disclaimer, the term of this patent is extended or adjusted under 35 U.S.C. 154(b) by 200 days.

(21) Appl. No.: 16/034,778

(22) Filed: Jul. 13, 2018

(65) Prior Publication Data
US 2019/0027794 A1 Jan. 24, 2019

Related U.S. Application Data (60) Provisional application No. 62/604,775, filed on Jul. 21, 2017.

(51) Int. Cl.
H01M 10/54 (2006.01)
B02C 23/10 (2006.01)
B02C 18/02 (2006.01)
H01M 10/0525 (2010.01)
B02C 18/06 (2006.01)
B02C 19/00 (2006.01)
(Continued)

(52) U.S. Cl.
CPC ............ H01M 10/54 (2013.01); B02C 18/02 (2013.01); B02C 18/06 (2013.01); B02C 19/0056 (2013.01); B02C 23/10 (2013.01); B02C 23/38 (2013.01); H01M 10/0525 (2013.01); B02C 2201/06 (2013.01); B03B 2009/066 (2013.01)

(58) Field of Classification Search
CPC ... H01M 10/54; H01M 10/0525; B02C 23/10; B02C 23/38; B02C 18/06; B02C 18/02; B03B 2009/066
USPC .......................................................... 241/14
See application file for complete search history.

(56) References Cited

U.S. PATENT DOCUMENTS 4,009,833 A * 3/1977 Litt ..................... H01M 10/54
241/14
4,384,683 A * 5/1983 Huwald ................ C01G 21/00
241/19

(Continued)

Primary Examiner — Faye Francis
(74) Attorney, Agent, or Firm — Nath, Goldberg & Meyer; Jerald L. Meyer (57) ABSTRACT The system for separating battery cell cores includes a cell core holder for receiving and holding a battery cell core. A cutter cuts an outer wrapping layer of the battery cell core to form an open loose end. A first roller rotates the battery cell core and a sheet opener engages the open loose end to unroll a laminate, which includes a cathode layer, an anode layer, and a polymer separator layer sandwiched therebetween. A pair of second rollers receive, grip and selectively drive movement of the laminate. A cathode breaker applies breaking force to the cathode layer to produce broken cathode layer pieces, which are then collected. An anode breaker then grasps and vibrates the laminate to produce broken anode layer pieces, which are also collected. Finally, a polymer separator layer cutter selectively cuts the polymer separator layer to produce cut polymer separator layer pieces, which are collected.

20 Claims, 5 Drawing Sheets

(51) Int. Cl.
*B02C 23/38* (2006.01)
*B03B 9/06* (2006.01)

(56) References Cited

U.S. PATENT DOCUMENTS

| | | | | | |
|---|---|---|---|---|---|
| 4,775,107 | A | * | 10/1988 | Heng | C22B 7/005 241/23 |
| 5,632,863 | A | * | 5/1997 | Meador | C10B 47/44 201/25 |
| 5,789,095 | A | * | 8/1998 | Miyagawa | H01M 10/54 29/730 |
| 6,177,056 | B1 | * | 1/2001 | Prengaman | B01D 53/501 241/24.11 |
| 6,524,737 | B1 | * | 2/2003 | Tanii | C22B 7/005 429/49 |
| 8,210,456 | B2 | * | 7/2012 | Stevens | B03B 9/061 241/19 |
| 8,807,466 | B2 | * | 8/2014 | Bhandari | B03B 9/061 241/23 |
| 8,979,006 | B2 | * | 3/2015 | Pudas | H01M 6/52 241/24.14 |
| 2016/0181023 | A1 | * | 6/2016 | Goto | H01G 11/42 241/16 |
| 2020/0078796 | A1 | * | 3/2020 | Kochhar | C22B 21/0015 |

* cited by examiner

SYSTEM AND METHOD FOR SEPARATING BATTERY CELL CORES

CROSS-REFERENCE TO RELATED APPLICATION

This application claims the benefit of U.S. Provisional Patent Application Ser. No. 62/604,775, filed on Jul. 21, 2017.

BACKGROUND

1. Field

The disclosure of the present patent application relates to the recycling of batteries, such as conventional lithium ion rechargeable batteries, for example, and particularly to a system and method for separating cell cores of such batteries into their individual cathode foil, anode foil and polymer separator layers.

2. Description of the Related Art

Lithium ion batteries are a very common type of rechargeable battery. The disposal and recycling of lithium ion batteries is of considerable interest, since such batteries not only contain valuable materials, but also contain materials which are quite hazardous, both to human beings and the environment. Prior to any chemical recycling process, such as, for example, hydrometallurgical or pyrometallurgical processes, in order to extract the valuable materials from the batteries (e.g., cobalt, lithium, copper, etc.), the batteries must first be safely disassembled, and the various material components must be carefully separated. Following removal of the outer metal casing, the remaining "cell core" must be broken down.

Conventional processes for breaking down cell cores typically involve breaking the cell core into small pieces, followed by extraction of the valuable metals from the resultant mixture. The separation process, however, is quite difficult, since the cathode and anode powders are mixed together. It would obviously be desirable to be able to easily break down battery cell cores while keeping the cathode layer, anode layer and polymer separator layer separate from one another. Thus, a system and method for separating battery cell cores solving the aforementioned problems is desired.

SUMMARY

The system for separating battery cell cores includes a cell core holder which is sized and shaped for receiving and holding a battery cell core. A loader, such as a ramp or the like, is coupled to the cell core holder for transferring the battery cell core to the cell core holder. A cutter is positioned adjacent the cell core holder for cutting an outer wrapping layer of the battery cell core to form an open loose end. A first roller selectively rotates the battery cell core within the cell core holder, and a sheet opener engages the open loose end of the battery cell core to unroll a laminate of the battery cell core. The laminate includes a cathode layer, an anode layer, and a polymer separator layer sandwiched therebetween. For example, for a conventional lithium ion battery, the cathode layer may include a relatively brittle aluminum foil, the anode layer may include a copper foil, and the polymer separator layer is positioned between each layer for electrochemical separation thereof.

A pair of second rollers receive, grip and selectively drive movement of the laminate. The pair of second rollers applies pressure to the relatively brittle cathode layer, providing an initial break force therefor, and a cathode breaker applies additional breaking force to the cathode layer of the laminate to produce broken cathode layer pieces. A cathode layer collection box is provided for receiving the broken cathode layer pieces.

An anode breaker then grasps and vibrates the laminate to produce broken anode layer pieces, which are collected in an anode layer collection box. Finally, a polymer separator layer cutter selectively cuts the polymer separator layer of the laminate to produce cut polymer separator layer pieces, which are then collected in a polymer separator layer collection box. A flap is provided for selectively covering the polymer separator layer collection box. The flap is selectively angled, thus providing a ramp-like surface, when the flap is closed, for directing the falling pieces into either the cathode layer collection box or the anode layer collection box. When the flap is opened, the cut pieces of the polymer separator layer may freely fall into the polymer separator layer collection box and are prevented from entering either the cathode layer collection box or the anode layer collection box.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
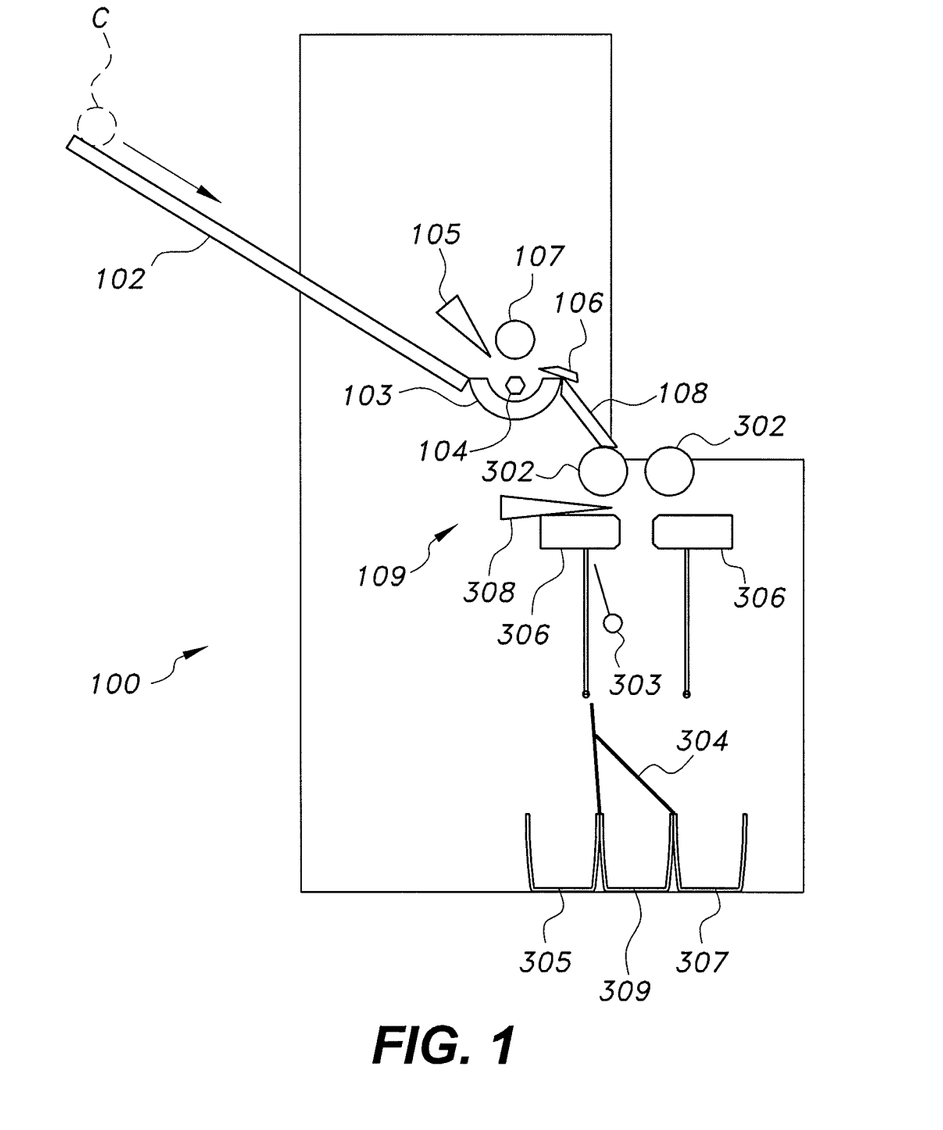
FIG. 1 diagrammatically illustrates a system for separating battery cell cores.

As shown in FIG. 1, the system for separating battery cell cores 100 receives untreated cell cores C via a loader 102. Although only a single untreated cell core C is shown in FIG. 1, it should be understood that multiple untreated cell cores C may be queued for individual release. The untreated cell core C may be, for example, the core of a lithium ion battery; i.e., a lithium ion battery in which the outer protective metal shell has already been removed. Loader 102 transfers the untreated cell core C to cell core holder 103. Although shown as a simple ramp which allows the untreated cell core C to roll into cell core holder 103 under the force of gravity, it should be understood that any suitable type of loading mechanism may be used to load the untreated cell core C into cell core holder 103.

Cell core holder 103 is preferably contoured and sized to fix the position of the untreated cell core C. It should be understood that the contouring and relative dimensions of cell core holder 103 are shown in FIGS. 1 and 2A-2C for exemplary purposes only. An additional grabbing or grasping system 104 may be provided for secure holding of the untreated cell core C. For example, grabbing or grasping system 104 may include a pair of needles which are diametrically opposed, with respect to the untreated cell core C, and which pierce the untreated cell core C. The grabbing or grasping system 104 may then be used to not only secure the untreated cell core C in place, but further selectively rotate the untreated cell core C. The rotation may be driven by a conventional motor or the like.

Figure 2A:
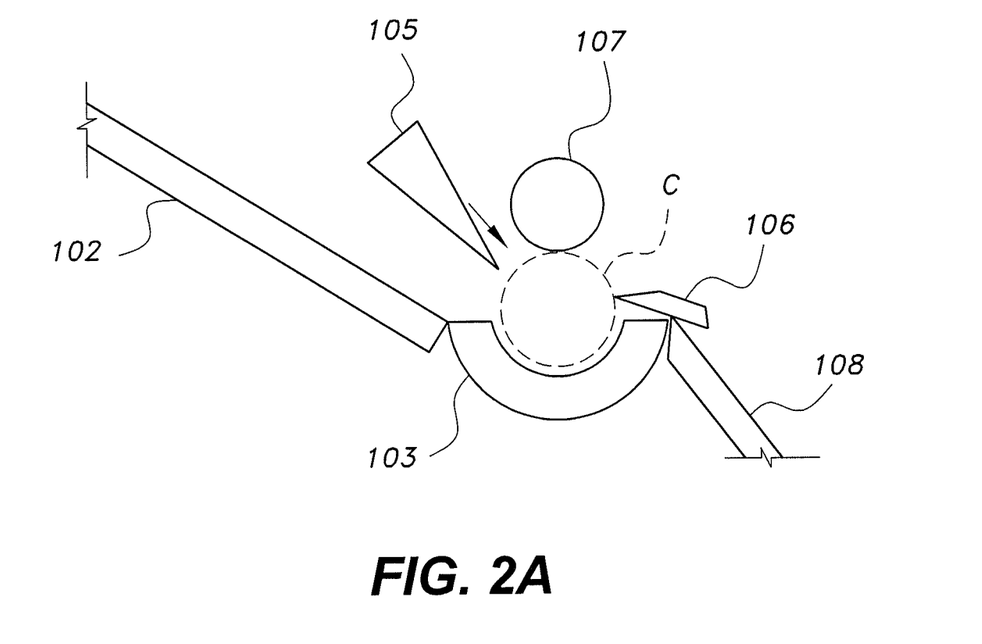
FIGS. 2A, 2B and 2C sequentially illustrate unrolling of a three-layer laminate from a battery cell core as implemented by the system for separating battery cell cores.
Figure 2B:
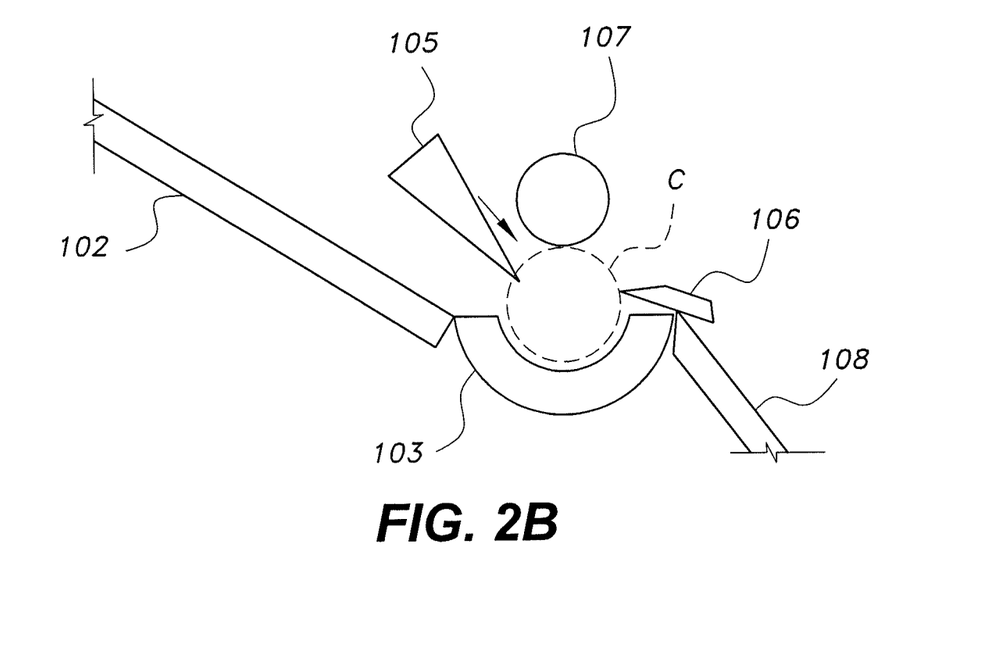

As best shown in FIGS. 2A and 2B, a cutter 105 is used to open the wrapping layer of the untreated cell core C. The cutter 105 may be a knife, a needle, a laser or the like. It should be understood that the non-limiting example of a blade, shown in FIGS. 2A and 2B, is shown for exemplary purposes only. As seen in FIG. 2B, the exemplary blade of cutter 105 is driven by a linear actuator, motor or the like to cut the outer plastic wrapping layer of the untreated cell core C to form an open loose end; i.e., cutter 105 makes an axial cut in the outer plastic wrapping layer. It should be understood that cutter 105 may cut more than only the outer wrapping layer; i.e., additional layers inside the cell core C may also be cut. In this case, the portion removed with the outer wrapping layer is considered to be waste material and is discarded, along with the outer wrapping layer. The remainder of the process, as described in detail below, is then followed.

Figure 2C:
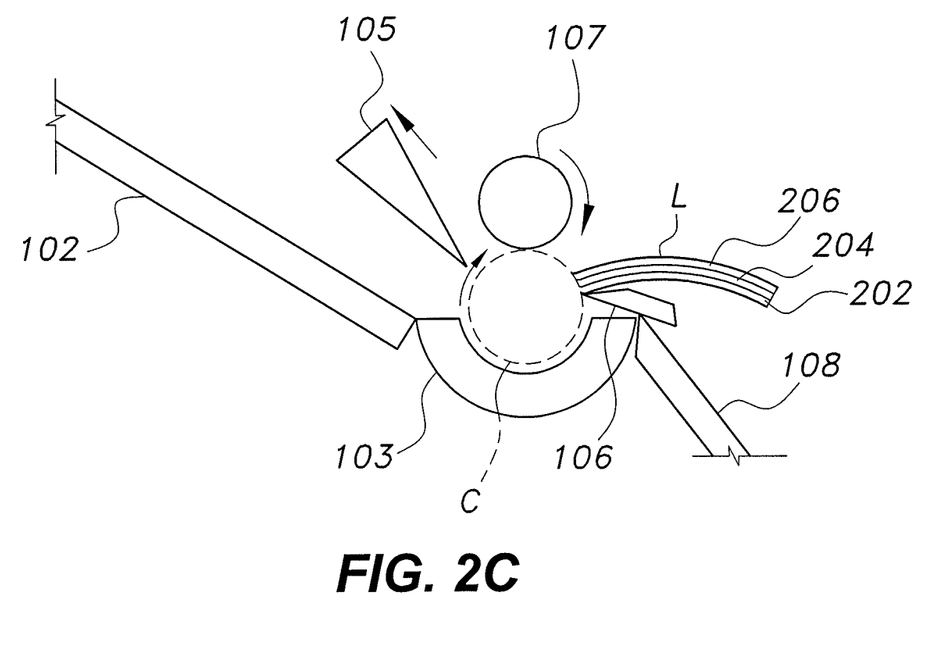

Following formation of the cut in the outer plastic wrapping layer, the cutter 105 returns to its initial standby position, as shown in FIG. 2C. The grabbing or grasping system 104 and/or an assistant roller 107, each driven by a motor or the like, rotate the untreated cell core C such that the open loose end of the untreated cell core C is directed toward a sheet opener 106.

Figure 3A:
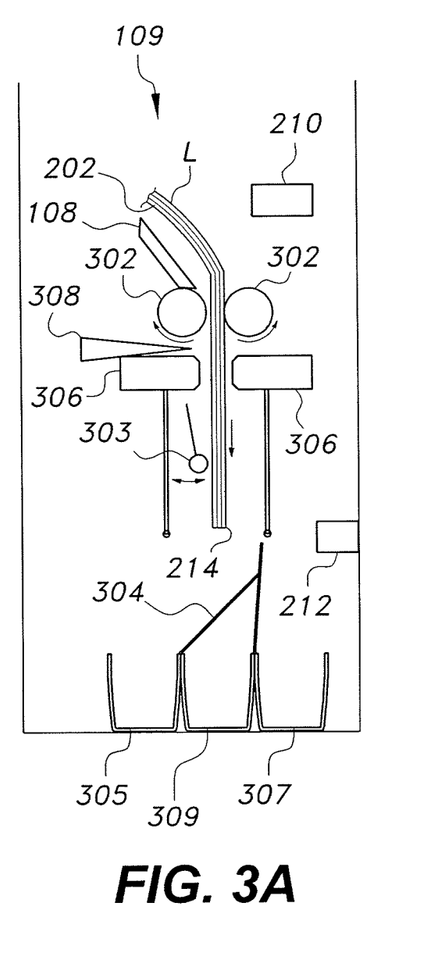
FIG. 3A diagrammatically illustrates a first stage of operation of a cell core layer separation mechanism of the system for separating battery cell cores in which a cathode layer of the laminate is separated and collected.

As shown in FIG. 2C, the sheet opener 106 unrolls the untreated cell core C into a laminate L of its three constituent layers, namely, cathode layer 202, anode layer 206, and polymer separator layer 204. As shown in FIGS. 1 and 3A, following unrolling by the sheet opener 106, the laminate L is directed towards cell core layer separation mechanism 109 by directing plate 108. In FIGS. 1 and 2A-2C, sheet opener 106 is shown as a bladed cutting element. It should be understood that the blade of sheet opener 106 is shown as a non-limiting example only in FIGS. 1 and 2A-2C, and that sheet opener 106 may be any suitable type of plate or other member which can open the cell core C at the location cut by cutter 105.

With reference to FIG. 3A, laminate L is fed, under guidance by directing plate 108, between a pair of rollers 302. It should be understood that the contouring and relative dimensions of directing plate 108 are shown in FIG. 1 for exemplary purposes only. Preferably, as shown, a first sensor 210 is positioned adjacent rollers 302, allowing the rollers 302 to be automatically activated when laminate L is detected. Rollers 302 act to not only pull laminate L downward, but the pressure exerted thereby on laminate L acts to break the relatively brittle cathode foil 202 (typically formed from brittle aluminum foil).

In addition to the pressure exerted by rollers 302, a cathode breaker 303 is provided for continuously tapping laminate L to further break the cathode foil 202 into pieces. Although shown in the form of a pendulum-type tapping mechanism, it should be understood that cathode breaker 303 may be any suitable type of mechanism for exerting a breaking force to the cathode foil 202. Since the aluminum cathode foil used in conventional lithium ion batteries is much more brittle than the conventional copper anode foil and the conventional polymer separator layer, the forces exerted by the rollers 302 and the cathode breaker 303 will break the aluminum foil 202 (containing cathode powders) into small pieces. These pieces will then fall into cathode layer collection box 305 under the force of gravity. In the non-limiting example of pendulum-type tapping cathode breaker 303, a periodic force, in the form of periodic taps or pulses, is delivered to cathode layer 202.

As shown, a cathode layer collection box 305, a polymer separator layer collection box 309 and an anode layer collection box 307 are each provided, with the polymer separator layer collection box 309 being sandwiched between cathode layer collection box 305 and anode layer collection box 307. In the initial stage of FIG. 3A, a flap 304 covers the a polymer separator layer collection box 309 and is angled such that the falling pieces only fall into cathode layer collection box 305. It should be understood that cathode layer collection box 305, polymer separator layer collection box 309, anode layer collection box 307 and flap 304 are each illustrated diagrammatically for purposes of illustration only, and that each may have any suitable size, contouring and relative dimensions. Further, as will be described in greater detail below, flap 304 is selectively opened and closed as well as being selectively angled. The movement of flap 304 may be driven by any suitable type of motor, linear actuator or the like. It should be understood that the particular arrangement of cathode layer collection box 305, polymer separator layer collection box 309 and anode layer collection box 307 is shown as a non-limiting example only, and that any desired arrangement thereof may be utilized. For example, rather than positioning cathode layer collection box 305 on the left (as in the exemplary arrangement of FIGS. 3A-3C), the cathode layer collection box 305 could be placed in the middle, between polymer separator layer collection box 309 and anode layer collection box 307. Where the particular pieces fall from the laminate is controlled by motion of the flap 304, thus, under the control of flap 304, any desired positioning of the collection boxes may be utilized.

Figure 3B:
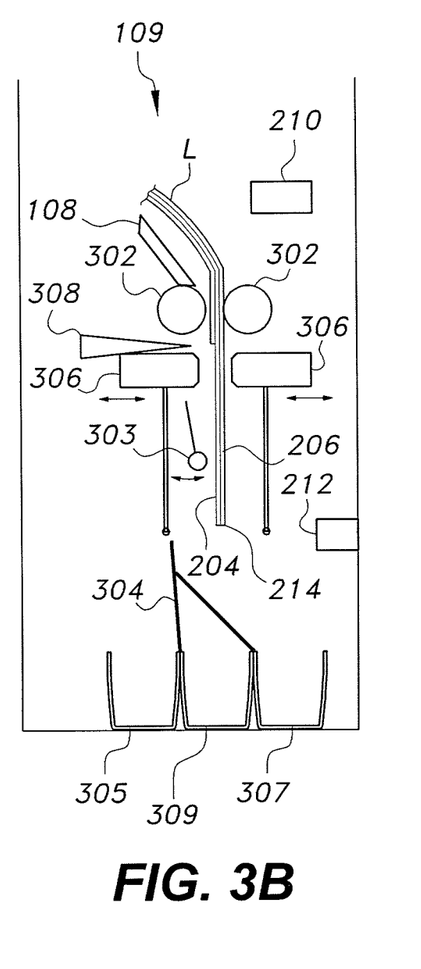
FIG. 3B diagrammatically illustrates a second stage of operation of the cell core layer separation mechanism of the system for separating battery cell cores in which an anode layer of the laminate is separated and collected.

When the lower end 214 of laminate L is detected by a second sensor 212, located just above the collection boxes 305, 307, 309, the rollers 302 stop. It should be understood that first and second sensors 210, 212 may be any suitable type of sensors, such as photodetectors, mechanical switches or the like. At this point, as shown in FIG. 3B, an anode breaker 306, which may include a pair of horizontally translating members, as shown, grasps laminate L. The anode breaker 306 then vibrates horizontally to break up the copper foil layer 206 (containing anode powders), and these broken pieces drop into the anode layer collection box 307. The cathode breaker 303 may continue its tapping motion to assist the breakage of anode layer 206. In the second stage of FIG. 3B, flap 304 covers the polymer separator layer collection box 309, but is angled in a direction opposite to that of FIG. 3A. Thus, the falling pieces in the second stage only fall into anode layer collection box 307.

Figure 3C:
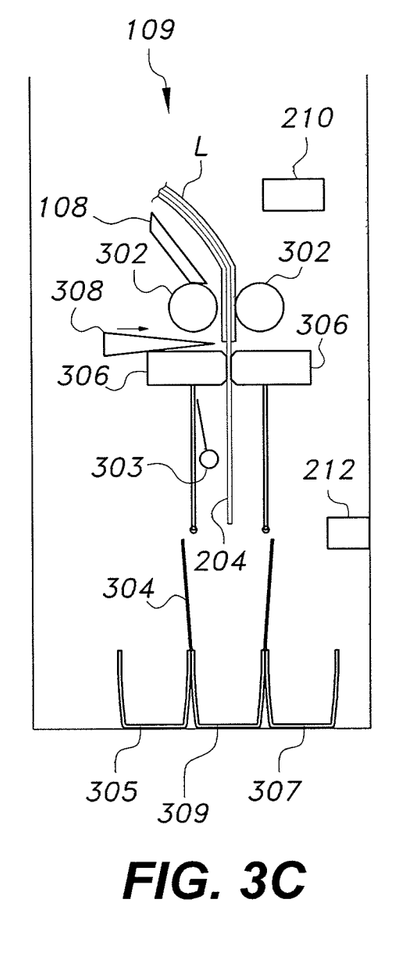
FIG. 3C diagrammatically illustrates a third stage of operation of the cell core layer separation mechanism of the system for separating battery cell cores in which a polymer separator layer of the laminate is cut and collected.

As shown in FIG. 3C, once the copper foil has been collected, a polymer separator cutter 308 moves in to cut the polymer separator layer 204, which is collected in the polymer separator layer collection box 309. Although polymer separator cutter 308 is shown in FIGS. 3A-3C as a horizontally translating blade, it should be understood that this is a non-limiting example only, and that polymer separator cutter 308 may be any suitable type of cutting element or device for cutting or severing polymer separator layer 204. In this third stage, flap 304 is open above the polymer separator layer collection box 309. As shown, flap 304 may be a two-piece flap, allowing for the configurations shown in FIGS. 3A, 3B and 3C, where each of the two pieces of flap 304 are vertically oriented in FIG. 3C, preventing any of the falling pieces from falling into either cathode layer collection box 305 or anode layer collection box 307. As shown, in the third stage, anode breaker 306 continues to grasp the laminate but no longer vibrates. Following the third stage, polymer separator cutter 308 returns to its initial standby positions.

It should be understood that the cell core layer separation mechanism 109 can be designed to cut the laminate L in one round or in multiple rounds, depending on the size of, and available space for, the system for separating battery cell cores 100. For a configuration in which laminate L is cut in a single round, the cell core layer separation mechanism 109 must be sufficiently long. For a typical cell core, the cell core layer separation mechanism 109 would have a length between approximately 1.0 and approximately 1.5 m. For a configuration in which the laminate L is cut in multiple rounds, the actions described above would be repeated multiple times. Once the polymer separator layer 204 has been cut, the cell rollers 302 are activated again to move the next portion of the laminate L downward. The above process is then repeated for each segment of laminate L.

Figure 4:
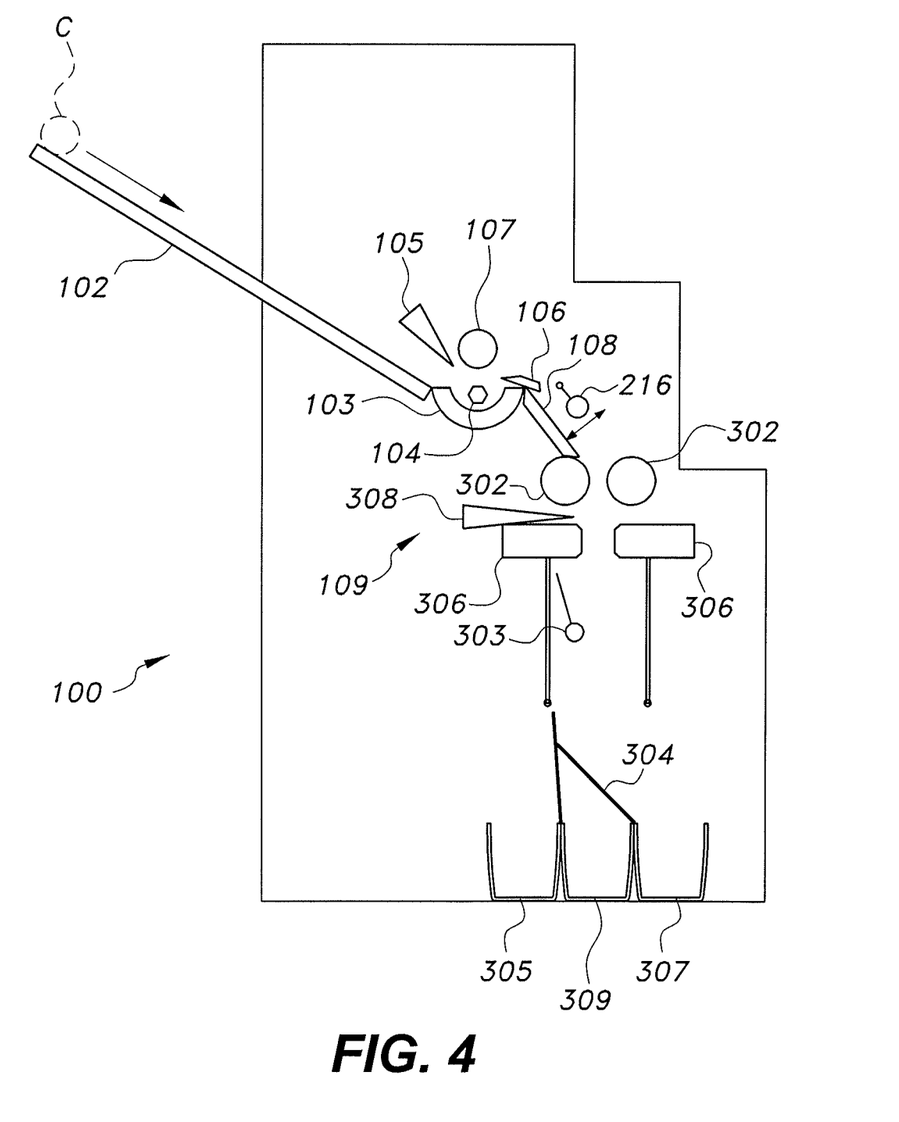
FIG. 4 diagrammatically illustrates an alternative embodiment of the system for separating battery cell cores.

As shown in FIG. 4, an additional cathode breaker 216 may be added, if necessary, for providing additional breaking force to laminate L before it enters rollers 302. In this alternative embodiment, rather than directly entering into the cell core layer separation mechanism 109, the laminate L is first continuously tapped by the additional cathode breaker 216 to break the aluminum cathode layer 202 into pieces. The process then proceeds as described above, where further breaking by cathode breaker 303 is more easily implemented. In this embodiment, it should be understood that additional components for assisting the fall of pieces broken by additional cathode breaker 216 may be added. As a non-limiting example, a fan or blower may be provided to blow the detached pieces of cathode foil down the directing plate 108 if they do not move down the directing plate 108 on their own (or under the driven motion of laminate L).

It is to be understood that the system and method for separating battery cell cores is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A system for separating battery cell cores, comprising:
a cell core holder adapted for receiving and holding a battery cell core;
a cutter for cutting an outer wrapping layer of the battery cell core to form an open loose end;
a first roller for selectively rotating the battery cell core within the cell core holder;
a sheet opener for engaging the open loose end of the battery cell core to unroll a laminate of the battery cell core, the laminate having a cathode layer, an anode layer, and a polymer separator layer sandwiched therebetween;
a pair of second rollers adapted for receiving and selectively driving movement of the laminate;
a cathode breaker for applying a breaking force to the cathode layer of the laminate to produce broken cathode layer pieces;
a cathode layer collection box for receiving the broken cathode layer pieces;
an anode breaker for grasping and vibrating the laminate to produce broken anode layer pieces;
an anode layer collection box for receiving the broken anode layer pieces;
a polymer separator layer cutter for cutting the polymer separator layer of the laminate to produce cut polymer separator layer pieces; and
a polymer separator layer collection box for receiving the cut polymer separator layer pieces.

2. The system for separating battery cell cores as recited in claim 1, further comprising a loader coupled to the cell core holder for transferring the battery cell core to the cell core holder.

3. The system for separating battery cell cores as recited in claim 2, wherein the loader comprises a ramp.

4. The system for separating battery cell cores as recited in claim 1, wherein the battery cell core is a cell core of a lithium ion battery.

5. The system for separating battery cell cores as recited in claim 4, wherein the cathode layer comprises aluminum foil.

6. The system for separating battery cell cores as recited in claim 5, wherein the anode layer comprises copper foil.

7. The system for separating battery cell cores as recited in claim 1, further comprising a directing plate mounted between the sheet opener and the pair of second rollers for guiding the laminate to the pair of second rollers.

8. The system for separating battery cell cores as recited in claim 1, wherein the cathode breaker applies periodic pulses of the breaking force to the cathode layer.

9. The system for separating battery cell cores as recited in claim 1, further comprising a flap for selectively covering the polymer separator layer collection box.

10. The system for separating battery cell cores as recited in claim 9, wherein the flap is selectively angled.

11. A system for separating battery cell cores, comprising:
a cell core holder adapted for receiving and holding a battery cell core;
a loader coupled to the cell core holder for transferring the battery cell core to the cell core holder;
a cutter for cutting an outer wrapping layer of the battery cell core to form an open loose end;
a first roller for selectively rotating the battery cell core within the cell core holder;
a sheet opener for engaging the open loose end of the battery cell core to unroll a laminate of the battery cell core, the laminate having a cathode layer, an anode layer, and a polymer separator layer sandwiched therebetween;
a pair of second rollers adapted for receiving and selectively driving movement of the laminate;
a cathode breaker for applying a breaking force to the cathode layer of the laminate to produce broken cathode layer pieces;
a cathode layer collection box for receiving the broken cathode layer pieces;
an anode breaker for grasping and vibrating the laminate to produce broken anode layer pieces;
an anode layer collection box for receiving the broken anode layer pieces;

a polymer separator layer cutter for cutting the polymer separator layer of the laminate to produce cut polymer separator layer pieces; and a polymer separator layer collection box for receiving the cut polymer separator layer pieces.

12. The system for separating battery cell cores as recited in claim 11, wherein the loader comprises a ramp.

13. The system for separating battery cell cores as recited in claim 11, wherein the battery cell core is a cell core of a lithium ion battery.

14. The system for separating battery cell cores as recited in claim 13, wherein the cathode layer comprises aluminum foil.

15. The system for separating battery cell cores as recited in claim 14, wherein the anode layer comprises copper foil.

16. The system for separating battery cell cores as recited in claim 11, further comprising a directing plate mounted between the sheet opener and the pair of second rollers for guiding the laminate to the pair of second rollers.

17. The system for separating battery cell cores as recited in claim 11, wherein the cathode breaker applies periodic pulses of the breaking force to the cathode layer.

18. The system for separating battery cell cores as recited in claim 11, further comprising a flap for selectively covering the polymer separator layer collection box.

19. The system for separating battery cell cores as recited in claim 18, wherein the flap is selectively angled.

20. A method of separating battery cell cores, comprising the steps of:

cutting an outer wrapping layer of a battery cell core to form an open loose end;

rotating the battery cell core and engaging the open loose end of the battery cell core to unroll a laminate of the battery cell core, wherein the laminate includes a cathode layer, an anode layer, and a polymer separator layer sandwiched therebetween;

applying a breaking force to the laminate to produce broken cathode layer pieces;

collecting the broken cathode layer pieces;

grasping and vibrating the laminate to produce broken anode layer pieces;

collecting the broken anode layer pieces;

cutting the polymer separator layer of the laminate to produce cut polymer separator layer pieces; and collecting the cut polymer separator layer pieces.

* * * * *